US008642171B2

(12) United States Patent
Liu

(10) Patent No.: US 8,642,171 B2
(45) Date of Patent: Feb. 4, 2014

(54) NON-STICK COATING HAVING IMPROVED ABRASION RESISTANCE, HARDNESS AND CORROSION ON A SUBSTRATE

(75) Inventor: Yuqing Liu, Shizuoka (JP)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/197,965

(22) Filed: Aug. 4, 2011

(65) Prior Publication Data

US 2012/0034448 A1 Feb. 9, 2012

Related U.S. Application Data

(60) Provisional application No. 61/371,406, filed on Aug. 6, 2010.

(51) Int. Cl.
*B32B 5/16* (2006.01)

(52) U.S. Cl.
USPC ............................ 428/323; 428/421; 428/422

(58) Field of Classification Search
USPC .................... 428/473.5, 474.4, 323, 421, 422
See application file for complete search history.

(56) References Cited

U.S. PATENT DOCUMENTS

| | | | | |
|---|---|---|---|---|
| 4,177,320 | A * | 12/1979 | Yoshimura et al. | 428/419 |
| 5,079,073 | A | 1/1992 | Tannenbaum | |
| 6,291,054 | B1 | 9/2001 | Thomas et al. | |
| 6,403,213 | B1 | 6/2002 | Huesmann | |
| 6,592,977 | B2 | 7/2003 | Thomas et al. | |
| 6,761,964 | B2 | 7/2004 | Tannenbaum | |
| 6,863,974 | B2 | 3/2005 | Shah et al. | |
| 2002/0002229 | A1 * | 1/2002 | Thomas et al. | 524/430 |
| 2002/0150778 | A1 * | 10/2002 | Leech et al. | 428/474.4 |
| 2007/0036900 | A1 | 2/2007 | Liu | |
| 2008/0050509 | A1 | 2/2008 | Nesbitt | |

FOREIGN PATENT DOCUMENTS

| | | | |
|---|---|---|---|
| EP | 1016466 | A2 | 7/2000 |
| WO | 2006066027 | A1 | 6/2006 |

OTHER PUBLICATIONS

International Search Report, PCT/US2011/046722, Van Der Hoeven, Maria, Filing Date Aug. 5, 2011.

* cited by examiner

*Primary Examiner* — Elizabeth A Robinson
(74) *Attorney, Agent, or Firm* — Andrew G. Burn

(57) ABSTRACT

The present invention provides for a substrate coated with a multi-layer non-stick coating which resists abrasion force and corrosion. The coating comprises a pre-primer base coat layer and at least two further coating layers, wherein at least two of said further coating layers comprise one or more fluoropolymer. The pre-primer base coat layer is substantially free of fluoropolymer, and comprises a heat resistant non-fluoropolymer polymer binder composition and inorganic filler particles, wherein greater than 50% of the inorganic filler particles are titanium dioxide, and wherein at least 10 weight % of said inorganic filler particles are large ceramic particles having an average particle size of at least 14 micrometers, and wherein some or all of the large ceramic particles extend from the pre-primer base coat layer at least into the next adjacent layer. The heat resistant non-fluoropolymer binder is preferably selected from the group consisting of polyimide (PI), polyamideimide (PAI), polyether sulfone (PES), polyphenylene sulfide (PPS) and a mixture thereof.

16 Claims, No Drawings

NON-STICK COATING HAVING IMPROVED ABRASION RESISTANCE, HARDNESS AND CORROSION ON A SUBSTRATE

FIELD OF THE INVENTION

This invention relates to multi-layer non-stick fluoropolymer coating compositions and substrates coated with these compositions, which coated substrates have improved abrasion resistance, hardness and corrosion resistance. In particular, the invention is in the field of producing improved cookware having a non-stick coating thereon, where the coating has improved abrasion resistance, hardness and corrosion resistance, while maintaining good adhesion to the substrate.

BACKGROUND OF THE INVENTION

Fluoropolymer resins, and especially perfluoropolymer resins, are known for their low surface energy and non-stick properties as well as thermal and chemical resistance. However, fluoropolymer coatings often show weak abrasion resistance and lower hardness. It has long been desirable to achieve longer wearing non-stick polymer coatings on metal substrates. Of particular concern to achieving coated substrates with longer service life is the coated substrate's ability to withstand abrasion. Abrasion refers to the amount of coating that is worn away as may occur by rubbing or sanding wherein the coating fibrillates and breaks away or shreds from the surface. In damaging a coated substrate, an initial scratch may be followed by abrasion, in that a knife which causes plastic deformation of the coating, may also lead to the formation of fibrils which are subsequently worn away. Such defects additionally compromise corrosion resistance.

A non-stick coating is optimized for release so as to prevent food particles from sticking to it after cooking or to facilitate low friction sliding contact in other applications. However, the attributes that result in desirable non-stick properties also result in difficulties in getting non-stick coatings to adhere well to the substrate. Good adhesion to the substrate is viewed as a pre-requisite for both good abrasion resistance and good corrosion resistance.

Generally in the art, adhesion has been achieved by roughening the metal substrate prior to application of the non-stick coating so that mechanical bonding will assist chemical interaction of binders in a primer layer in promoting adhesion. Typical roughening includes acid-etching, sanding, grit-blasting, brushing and baking a rough layer of glass, ceramic or enamel frit onto the substrate. Such treatments are a partial but insufficient solution to the adhesion problem.

Prior efforts at achieving scratch-resistant and abrasion resistant coatings have included using harder auxiliary heat resistant resins along with perfluorocarbon polymers, or using fillers such as mica and aluminum flake. However, adding fillers (inorganic or organic) into the primer layer may result in weak adhesion to the substrate or to the upper layer or both, or, the non-stick property may be weakened if fillers are added to the top coat. And addition of fluororesin into the primer layer may result in weak adhesion to the substrate, or weaken the intercoat adhesion for the midcoat or topcoat if fluororesins are added to the midcoat or top coat layer.

U.S. Pat. No. 6,761,964 (to Tannenbaum) discloses a coated substrate having a non-stick coating comprising a primer layer adhered to the substrate wherein the primer layer comprises inorganic film hardener including large ceramic particles essentially encapsulated by the primer layer and extending into the midcoat layer.

SUMMARY OF THE INVENTION

The present invention addresses the need for a durable, non-stick coating with superior abrasion resistance and corrosion resistance. The present invention provides a new pre-primer for a non-stick coating. The new pre-primer provides improved abrasion resistance, hardness and corrosion resistance without sacrificing adhesion to the substrate. The present invention utilizes high levels of fillers in a pre-primer layer, particularly silicon carbide and titanium dioxide for higher abrasion resistance and hardness; herein, high levels of fillers means that the weight ratio of inorganic filler particles to polymer binder solids is greater than 1.0. The high level of fillers reduces the stress in the dry film contributing to stronger adhesion to the substrate. High levels of titanium dioxide increases the dry film density. Additionally, high levels of titanium dioxide, such as titanium dioxide levels greater than 50% of the inorganic filler in the pre-primer, are found to provide significantly higher corrosion resistance.

The invention provides a substrate coated with a non-stick coating which resists abrasion force, the coating comprising a highly filled base coat comprising a non-fluoropolymer resin and containing both titanium dioxide and large ceramic particles which latter extend from the pre-primer base coat layer at least into the next adjacent layer.

In an embodiment, the invention provides a substrate coated with a multi-layer non-stick coating which resists abrasion force, said coating comprising: (a) a pre-primer base coat layer, substantially free of fluoropolymer, having a dry film thickness of at least 10 micrometers comprising a heat resistant non-fluoropolymer polymer binder composition and inorganic filler particles, wherein the weight ratio of inorganic filler particles to polymer binder solids is greater than 1.0, and wherein at least 10 weight % of said inorganic filler particles are large ceramic particles having an average particle size of at least 14 micrometers, and greater than 50% of the inorganic filler particles are titanium dioxide; (b) at least two further coating layers, wherein the further coating layers are free of inorganic filler particles having an aspect ratio of greater than 3.0, and wherein at least two of said further coating layers comprise one or more fluoropolymer; and wherein a portion of the large ceramic particles extend from the pre-primer base coat layer at least into the next adjacent layer.

In an embodiment, at least 60% of the inorganic filler particles in the base coat are titanium dioxide.

In an embodiment, the base coat has a dry film thickness of at least about 12 micrometers; or it may have a dry film thickness in the range of about 10 to about 40 micrometers; or preferably in the range of about 14 to about 20 micrometers.

In an embodiment, the heat resistant non-fluoropolymer binder comprises a polymer selected from the group consisting of polyimide (PI), polyamideimide (PAI), polyether sulfone (PES), polyphenylene sulfide (PPS) and a mixture thereof.

In an embodiment, the non-fluoropolymer binder comprises polyamideimide (PAI) having a number average molecular weight of no more than 15,000, or less than 15,000. For example, the non-fluoropolymer binder may comprise polyamideimide (PAI) having a number average molecular weight in the range of about 8,000 to about 15,000, or from 8,000 to less than 15,000.

In another embodiment, the non-fluoropolymer binder comprises polyamideimide (PAI) having a number average molecular weight of at least 15,000. For example, the non-fluoropolymer binder may comprise polyamideimide (PAI) having a number average molecular weight in the range of about 15,000 to about 30,000.

In an embodiment, the non-fluoropolymer binder comprises a combination of polyamideimide (PAI) and polyphenylene sulfide (PPS).

In an embodiment, the substrate is a metal substrate selected from the group consisting of aluminum, stainless steel, and carbon steel.

In an embodiment, the inorganic filler comprises one or more of the inorganic oxides of titanium, aluminum, zinc, tin and mixtures thereof. Preferably, the inorganic filler comprises titanium dioxide.

In an embodiment, the ceramic particles have an average particle size, $d_{50}$, greater than 20 micrometers. Preferably, the ceramic particles have an average particle size, $d_{50}$, in the range of 14 to 60 micrometers.

In an embodiment, the ceramic particles have a Knoop hardness of at least 1200.

In an embodiment, the ceramic particles have an aspect ratio of not greater than 2.5.

In an embodiment, the ceramic particles are selected from a group consisting of inorganic nitrides, carbides, borides and oxides. Particularly preferred ceramic particles are silicon carbide.

In an embodiment, the silicon carbide particles have an aspect ratio of not greater than 2.5 and an average particle size greater than 20 micrometers.

In an embodiment, at least 90% by weight of the total weight of inorganic filler particles consists only of silicon carbide and titanium dioxide.

In an embodiment, the multi-layer non-stick coating comprises a pre-primer layer, a primer layer, and a top coat and optionally one or more intermediate layers. For example, the non-stick coating may consist of a pre-primer, a primer, an intermediate layer and a top coat layer.

Also envisioned are additional embodiments that result from the combination of the components described in the above embodiments.

In a preferred embodiment, the ceramic particles are silicon carbide particles having an aspect ratio of not greater than 2.5 and an average particle size greater than 20 micrometers, and at least 90% by weight of the total weight of inorganic filler particles consists only of silicon carbide and titanium dioxide.

DETAILED DESCRIPTION OF THE INVENTION

The present invention provides a multi-layer non-stick coating on a substrate, which coating provides superior abrasion resistance, hardness and corrosion resistance while maintaining the properties of good release from the upper surface and good adhesion to the substrate. The invention provides for a substrate coated with a multi-layer non-stick coating which resists abrasion force, said coating comprising: (a) a pre-primer base coat layer, substantially free of fluoropolymer, having a dry film thickness of at least 10 micrometers comprising a heat resistant non-fluoropolymer polymer binder composition and inorganic filler particles, wherein the weight ratio of inorganic filler particles to polymer binder solids is greater than 1.0, and wherein at least 10 weight % of said inorganic filler particles are large ceramic particles having an average particle size of at least 14 micrometers, and greater than 50% of the inorganic filler particles are titanium dioxide; (b) at least two further coating layers, wherein the further coating layers are free of inorganic filler particles having an aspect ratio of greater than 3.0, and wherein at least two of said further coating layers comprise one or more fluoropolymer; and wherein a portion of the large ceramic particles extend from the pre-primer base coat layer at least into the next adjacent layer.

Herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The individual coating layers may be formed from wet compositions that may be aqueous or solvent-borne. Preferably, for environmental reasons, the compositions are aqueous compositions; the latter may include some amount of solvent, such as, for example, N-Methylpyrrolidone (NMP) to aid in film formation, although preferably the amount of solvent is minimized.

The heat resistant non-fluoropolymer binder component of the pre-primer base coat layer of the present invention is composed of polymer which is film-forming upon heating to fusion, thermally stable and has a sustained use temperature of at least about 140° C. The main function of this component is to adhere the fluoropolymer-containing layers to substrates, particularly metal substrates, and for film-forming within and as part of the layer. Fluoropolymer by itself has little to no adhesion to a substrate, and its presence would detract from adhering well to the substrate. Accordingly, the pre-primer base coat layer is essentially free of fluoropolymer. Preferably, the pre-primer base coat layer contains no fluoropolymer. The binder of the base coat is non-fluorine containing and yet adheres, or is reactive to, a fluoropolymer which is preferably contained in at least two layers of the non-stick coating applied over the base coat. Examples of such polymer binders include one or more: (1) polysulfones, which are amorphous thermoplastic polymers with a glass transition temperature of about 185° C. and a sustained service temperature of about 140° C. to 160° C., (2) polyethersulfones (PES), which are amorphous thermoplastic polymers with a glass transition temperature of about 230° C. and a sustained service temperature of about 170° C. to 190° C., (3) polyimides, polyamide imides (PAI) and/or polyamic acid salt which converts to polyamideimide, which imides crosslink upon heating of the coating to fuse it and have a sustained service temperature in excess of 250° C., among others. Herein, the term "polyamide imide" includes, in the alternative, polyamic acid or salt thereof, which may readily be converted to polyamide imide. In a preferred embodiment, such as when using PAI as described below, the heat resistant non-fluoropolymer binder is soluble in an organic solvent.

One skilled in the art will recognize the possibility of using mixtures of high temperature resistant polymer binders in the practice of this invention. Multiple binders are contemplated for use in this invention, especially when certain properties are desired, such as flexibility, hardness, steam resistance, corrosion resistance and especially sprayability.

Average particle size is defined herein as a given particle size where, in a given volume of particles, 50% of the total volume of particles have a particle size smaller than or equal to the given particle size, and is defined by the parameter, $d_{50}$, being equal to the given particle size. For instance, $d_{50}$=0.15 micrometers means the total volume of the particles whose particle size is smaller than or equal to 0.15 micrometers is 50%. Particle size is defined herein as a given particle size where, in a given volume of particles, 100% of the total volume of particles have a particle size smaller than or equal to the given particle size, and is defined by the parameter $d_{100}$ being equal to the given particle size. For instance, $d_{100}$=0.30 micrometers means the total volume of the particles whose particle size is smaller than or equal to 0.30 micrometers is 100%, in other words all the particles are smaller or equal to 0.30 micrometers. In this invention, at least 10 weight % of the inorganic filler particles are large ceramic particles having an average particle size, $d_{50}$, of at least 14 micrometers, and preferably an average particle size, $d_{50}$, of at least 20 micrometers.

In one preferred embodiment, polyphenylene sulfide (PPS) which is insoluble in organic liquids is added as insoluble powder particles to the solution of polymer binder. Polyphenylene sulfides (PPS) are partially crystalline polymers with a melting temperature of about 280° C. and a sustained service temperature of about 200° C. to 240° C. In an embodiment, the PPS particles have an average particle size $d_{50}$ in the range of from about 5 micrometers to about 20 micrometers. Particularly useful are PPS powder particles having an average particle size ($d_{50}$) of 10 micrometers with a $d_{100}$ of 42 micrometers. Addition of PPS particles aids in spraying a liquid solution of polymer binder. In particular, when particles of PPS are added to a solution of high molecular weight PAI for application to substrates, improved sprayability is recognized for this high viscosity composition. This is in contrast to controlling the PAI viscosity by simple dilution which tends to result in sagging of the coating upon application. In a preferred embodiment, the non-fluoropolymer binder comprises a mixture of PAI in solution or dispersion and insoluble PPS powder particles. For use in this invention, the ratio of PAI:PPS in wt % solids may be in the range of 80:20 to 20:80, and the preferred ratio of PAI:PPS in wt % solids is in the range of 49:51 to 35:65.

In an embodiment, the liquid used in the pre-primer of this invention is an organic solvent which dissolves the high temperature resistant polymer binder, i.e., the predominant liquid present in the pre-primer composition is organic solvent. Such solvents include N-methylpyrrolidone (NMP), dimethylformamide, dimethylacetamide, dimethylsulfoxide, and cresylic acid, which will depend on the particular polymer binder being used. NMP is a preferred solvent because of its relative safety and environmental acceptability. One skilled in the art will recognize that mixtures of solvents can be used. The use of an organic solvent in such an embodiment avoids the initial creation of rust on the cleaned and grit-blasted substrate, sometimes referred to as "flash rust".

However, as stated above, aqueous compositions are preferred; the addition of a small amount of solvent, such as NMP, may aid film formation of the heat resistant non-fluoropolymer binder component.

An example of a preferred binder is polyamide imide (PAI) dissolved into a coalescing agent such as N-methylpyrolidone prior to adding the inorganic filler. Any molecular weight PAI may find utility, and any commercially available PAI may be suitable. PAI having a number average molecular weight of 8,000-15,000 is preferred. In an embodiment, the polyamideimide has a number average molecular weight of at least about 15,000; such as, for example, in the range of about 15,000 to about 30,000; or from about 18,000 to about 25,000. This higher molecular weight PAI affords the production of thicker films of base coat, i.e., at least about 10 micrometers dried film thickness (DFT). High molecular weight polyamide imide is available from Hitachi Chemical. The use of a higher number average molecular weight of PAI in the base coat is correlated with the ability to form thicker coatings without the occurrence of bubble formation.

As noted above, fluoropolymers have a low surface energy and do not adhere well to substrates. To achieve better adhesion to the substrate, especially stainless steel, the liquid composition used in this invention to form the base coat is substantially free of fluoropolymer, and preferably is essentially free of fluoropolymer. Herein, substantially free of fluoropolymer means that the composition employed forms a dry base coat that contains less than 5 weight % of total solids of fluoropolymer. Essentially free of fluoropolymer means that the composition employed forms a base coat that contains less than about 0.5 weight % total solids of such fluoropolymers. More preferably, the base coat contains no fluoropolymer.

The inorganic filler particles are one or more filler type materials which are inert with respect to the other components of the composition and thermally stable at its eventual baking temperature which fuses the fluoropolymer and binder. The filler is water insoluble so that it is typically uniformly dispersible but not dissolved in the aqueous dispersion form of the composition of the invention. The inorganic filler particles of the pre-primer base coat comprise large ceramic particles having an average particle size of at least 14 micrometers, preferably at least 20 micrometers, and more preferably at least 25 micrometers. Most preferably, the ceramic particles have an average particle size of at least 40 micrometers.

The ceramic particles of the inorganic filler particles preferably have an aspect ratio (defined below) of not greater than 2.5, and more preferably not greater than 1.5.

By aspect ratio is meant a ratio of the longest diameter "b" of the particle to the greatest distance of a dimension "s" measured perpendicular to the longest diameter (major axis) of the particle. The aspect ratio is a means of quantifying a preferred particle shape and orientation. Particles with a high aspect ratio are flat or elongated, unlike the preferred particles of this invention, which are preferably more spherical and more closely approach an ideal aspect ratio of 1. If particles in a coating on a substrate are small and have a high aspect ratio, they may be oriented parallel to a substrate and will not be able to deflect abrasive forces applied to a coated substrate. If particles are large and have a high aspect ratio, they may be oriented perpendicular to a substrate and protrude through a coating. An abrasive force may push against the tops of such particles distorting a coating and even pulling a particle from the coating, leaving a hole and causing the coating to be more rapidly abraded.

Further, the ceramic particles of the inorganic filler particles preferably have a Knoop hardness of at least 1200 and, more preferably, of at least 1500. Knoop hardness is a scale for describing the resistance of a material to indentation or scratching. Values for the hardness of minerals and ceramics are listed in the *Handbook of Chemistry,* $77^{th}$ Edition, pp. 12-186, 187 based on reference material from Shackelford and Alexander, *CRC Materials Science and Engineering Handbook*, CRC Press, Boca Raton Fla., 1991. The inorganic filler particles impart durability to the non-stick fluoropolymer composition applied as a coating on a substrate by deflecting abrasive forces applied to the coating surface and by resisting penetration of sharp objects that have penetrated the fluoropolymer overcoat.

Preferably the pre-primer base coat comprises at least 51 wt % of inorganic filler particles which particles include large ceramic particles that have an average particle size of at least 14 micrometers, preferably at least 20 micrometers, and more preferably at least 25 micrometers. At least a portion of the ceramic particles contained in the pre-primer base coat composition and applied to the substrate extend through the thickness of the pre-primer layer and into the adjacent (primer) layer.

Examples of inorganic filler particles include inorganic oxides, carbides, borides and nitrides having a Knoop hardness of at least 1200. Preferred are inorganic oxides, nitrides, borides and carbides of zirconium, tantalum, titanium, tungsten, boron, aluminum and beryllium. Particularly preferred are silicon carbide and aluminum oxide. Typical Knoop hardness values for preferred inorganic compositions are: zirconia (1200); aluminum nitride (1225); beryllia (1300); zirconium nitride (1510); zirconium boride (1560); titanium nitride (1770); tantalum carbide (1800); tungsten carbide (1880); alumina (2025); zirconium carbide (2150); titanium carbide (2470); silicon carbide (2500); aluminum boride (2500); titanium boride (2850). Silicon carbide is the most preferred large ceramic particle.

In addition to the large particles of inorganic filler particles, the non-stick coating compositions of this invention may contain smaller particles of inorganic filler particles as well as other filler materials having a Knoop hardness value of less than 1200. Preferably at least 10 wt % of the inorganic filler particles in the base coat pre-primer layer are large ceramic particles having an average particle size of at least 14 micrometers, preferably at least 20 micrometers, and more preferably at least 25 micrometers. More preferably at least 20 wt %, and even more preferably at least 30 wt %, of the inorganic filler particles in the base coat pre-primer layer are large ceramic particles having an average particle size of at least 14 micrometers, preferably at least 20 micrometers, and more preferably at least 25 micrometers. In a preferred embodiment, the large ceramic particles have an average particle size of at least 40 micrometers.

Suitable additional fillers include small particles of aluminum oxide, calcined aluminum oxide, silicon carbide etc. as well as glass flake, glass bead, glass fiber, aluminum or zirconium silicate, mica, metal flake, metal fiber, fine ceramic powders, silicon dioxide, barium sulfate, talc, etc. A preferred additional filler is titanium dioxide. Greater than 50% of the inorganic filler particles in the pre-primer base coat layer are titanium dioxide, and preferably at least 60% of the inorganic filler particles in the pre-primer base coat layer are titanium dioxide. The titanium dioxide may have a particle size of 0.1-2.0 micrometers, or preferably from 0.1-1.0 micrometers.

The filler particle size is a volume distribution particle size $d_{50}$ determined using a Helos & Rodos Laser Diffraction Analyser available from SYMPATEC GmbH (Germany). The filler particles prevent shrinkage of the base coat upon drying and baking. Much like the PPS particles described above, the filler particles also aid in viscosity reduction in compositions having the same % solids and therefore sprayability of the liquid composition. The presence of a range of particle sizes of the filler particles is critical. Larger filler particles improve abrasion resistance and sprayability, whereas smaller size particles lead to improved corrosion resistance. In one embodiment, the liquid composition used in this invention to form the pre-primer base coat layer contains heat resistant polymer binder and from 51 wt % (of the total solids of the composition) of inorganic filler particles to no greater than about 80 wt % (of the total solids of the composition) of inorganic filler particles.

The compositions of the present invention can be applied to substrates by conventional means. Spray and roller applications are the most convenient application methods, depending on the substrate being coated. Other well-known coating methods including brush application, dipping and coil coating are suitable.

The substrate is preferably a metal for which abrasion resistance of the coated substrate is increased by the application of a base coat followed by layers of a non-stick coating. Examples of useful substrates include aluminum, anodized aluminum, carbon steel, and stainless steel. As noted above, the invention has particular applicability to stainless steel. Because stainless steel exhibits poor heat distribution properties, cooking pans are often constructed from multi-plies of aluminum and stainless steel, the aluminum providing more even temperature distribution to the cooking pan and the stainless steel providing a corrosion resistant cooking surface.

Prior to applying the liquid pre-primer base coat composition, the substrate is preferably cleaned to remove contaminants and grease which might interfere with adhesion. Preferably, the substrate is then grit-blasted. The cleaning and/or grit-blasting steps enable the base coat to better adhere to the substrate. Conventional soaps and cleansers can be used for cleaning. The substrate can be further cleaned by baking at high temperatures in air, temperatures of 800° F. (427° C.) or greater. The cleaned substrate is then grit blasted, with abrasive particles, such as sand or aluminum oxide, to form a roughened surface to which the base coat can adhere. The roughening that is desired for base coat adhesion can be characterized as a roughness average of 40-160 microinches (1-4 micrometers).

In a preferred embodiment the base coat is applied by spraying. The base coat is applied to a dried film thickness (DFT) of greater than about 10 micrometers, preferably greater than about 12 micrometers and in other embodiments in ranges of about 10 to about 20 micrometers; and, preferably, about 14 to about 17 micrometers. The thickness of the base coat affects the corrosion resistance. If the base coat is too thin, the substrate will not be fully covered resulting in reduced corrosion resistance. If the base coat is too thick, the coating will crack or form bubbles resulting in areas that will allow salt ion attack and therefore reduce corrosion resistance. The liquid composition is applied and then dried to form a base coat. Drying temperature will vary based on the composition from 120° C. to 250° C., but for example may be typically 150° C. for 20 minutes or 180° C. for 10 minutes.

After the base coat is applied and dried, conventional non-stick coatings can be applied preferably in the form of a primer and a top coat and may include one or more intermediate coats. One preferred multilayer coating includes a pre-primer (14-17 micrometers), primer (11-15 micrometers), an intermediate layer (12-15 micrometers) and a top coat (4-8 micrometers). Other coating thicknesses may also be used. The non-stick coating may comprise any suitable non-stick composition e.g., silicone or fluoropolymers. Fluoropolymers are especially preferred. After the application of the multi-layer non-stick coating, the substrate is baked. In one preferred embodiment with the 4 layer non-stick fluoropolymer coating the substrate is baked at 427° C. for 3-6 minutes, but baking times will be dependent on the composition and thickness of the non-stick coating.

The fluoropolymers used in the upper layers of the non-stick coatings for use in this invention may include one or more non melt-fabricable fluoropolymer with a melt viscosity of at least $1\times10^7$ Pa·s. One embodiment is polytetrafluoroethylene (PTFE) having a melt viscosity of at least $1\times10^8$ Pa·s at 380° C. with the highest heat stability among the fluoropolymers. Such PTFE can also contain a small amount of comonomer modifier which improves film-forming capability during baking (fusing), such as perfluoroolefin, notably hexafluoropropylene (HFP) or perfluoro(alkyl vinyl)ether, notably wherein the alkyl group contains 1 to 5 carbon atoms, with perfluoro(propyl vinyl ether) (PPVE) being preferred. The amount of such modifier will be insufficient to confer melt-fabricability to the PTFE, generally being no more than 0.5 mole %. The PTFE, also for simplicity, can have a single melt viscosity, usually at least $1\times10^9$ Pa·s, but a mixture of PTFEs having different melt viscosities can be used to form the non-stick component.

The fluoropolymers can also be melt-fabricable fluoropolymer, either combined (blended) with the PTFE, or in place thereof. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-5 carbon atoms, especially 1-3 carbon atoms. Especially preferred comonomers include hexafluoropropylene (HFP), perfluoro(ethyl vinyl ether) (PEVE), perfluoro(propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The molecular weight of the melt-fabricable tetrafluoroethylene copolymers is unimportant except that it be sufficient to be film-forming and be able to sustain a molded shape so as to have integrity in the undercoat application. Typically, the melt viscosity will be at least $1\times10^2$ Pa·s and may range up to about $60\text{-}100\times10^3$ Pa·s as determined at 372° C. according to ASTM D-1238. A preferred composition is a blend of non melt-fabricable fluoropolymer with a melt viscosity in the range from $1\times10^7$ to $1\times10^{11}$ Pa·s and melt fabricable fluoropolymer with a viscosity in the range from $1\times10^3$ to $1\times10^5$ Pa·s.

The fluoropolymer component is generally commercially available as a dispersion of the polymer in water, which is the preferred form for the composition of the invention for ease of application and environmental acceptability. By “dispersion” is meant that the fluoropolymers particles are stably dispersed in the aqueous medium, so that settling of the particles does not occur within the time when the dispersion will be used. This is achieved by the small size of the fluoropolymer particles, typically on the order of 0.2 micrometers, and the use of surfactant in the aqueous dispersion by the dispersion manufacturer. Such dispersions can be obtained directly by the process known as dispersion polymerization, optionally followed by concentration and/or further addition of surfactant.

Useful fluoropolymers also include those commonly known as micropowders. These fluoropolymers generally have a melt viscosity $1\times10^2$ Pa·s to $1\times10^6$ Pa·s at 372° C. Such polymers include but are not limited to those based on the group of polymers known as tetrafluoroethylene (TFE) polymers. The polymers may be directly polymerized or made by degradation of higher molecular weight PTFE resins. TFE polymers include homopolymers of TFE (PTFE) and copolymers of TFE with such small concentrations of copolymerizable modifying comonomers (<1.0 mole percent) that the resins remain non-melt-processible (modified PTFE). The modifying monomer can be, for example, hexafluoropropylene (HFP), perfluoro(propyl vinyl)ether (PPVE), perfluorobutyl ethylene, chlorotrifluoroethylene, or other monomer that introduces side groups into the molecule.

Further in accordance with the present invention, the abrasion resistant base coat composition may comprise a liquid organic solvent, a soluble heat resistant non-fluoropolymer binder as described above and insoluble particles of heat resistant non-fluoropolymer binder.

Also in accordance with the present invention there is provided an abrasion resistant base coat composition comprising polyamideimide (PAI) heat resistant polymer binder, a liquid solvent, insoluble particles of heat resistant polyphenylene sulfide (PPS) binder; and inorganic filler particles, which comprise large particles of silicon carbide having average particle size of at least 14 micrometers or, preferably, at least 20 micrometers, and smaller particles of titanium dioxide having an average particle size of from 0.1-1.0 micrometers. The weight ratio of inorganic filler particles to polymer binder is greater than 1.0; and at least 10 weight %, preferably at least 20 weight %, and more preferably greater than 30 weight % of the inorganic filler particles are silicon carbide particles having an average particle size of at least 14 micrometers or, preferably, at least 20 micrometers; and greater than 50 weight % of the inorganic filler particles are the smaller titanium dioxide particles. More preferably, greater than 60 weight % of the inorganic filler particles are the smaller titanium dioxide particles. In an embodiment, greater than 90% of the inorganic filler particles consist of silicon carbide and titanium dioxide.

Products having abrasion resistant non-stick finishes of the present invention include fry pans, sauce pans, bakeware, rice cookers and inserts therefor, electrical appliances, iron sole plates, conveyors, chutes, roll surfaces, cutting blades, processing vessels and the like.

TEST METHODS

Abrasion Resistance Test

The abrasion resistance of the paint films was determined using the Thrust Washer Abrasion Test, as described by ASTM procedure D3702-94 (2004). The machine tests a coating that is applied to a precision-machined washer. The opposing surface is an uncoated steel ring by which the coating will be abraded. The coated test specimens are loaded into the test machine, and the machine is set to run for a specified time. After the experiment, the film thickness change and weight loss can be measured from which data an array of wear measures can be calculated and the abrasion resistance can be judged. A lower weight loss corresponds to better abrasion resistance.

In an alternative test procedure, a stainless steel pin is positioned perpendicular to the coated surface of the test substrate (frying pan) with a weight load upon the pin such that it impinges on the coated surface with a constant force. Prior to starting the test, the frying pan is heated to 200° C. Then, the pin is moved mechanically backwards and forwards, repetitively, on the coating surface; one cycle corresponds to one forward and one backward motion across the coated surface. The test proceeds until the coating is abraded through to the substrate and the output result is recorded as the number of repeat abrasive cycles that occur until the coating is abraded through to the substrate. A higher number of cycles corresponds to better abrasion resistance.

Pencil Hardness Test with Scale for Results

The hardness of the paint films was assessed by pencil hardness, a standard industry test. Pencils of a range of hardness (from soft to hard: 4B, 3B, 2B, HB, F, H, 2H, 3H, 4H; Pencil: Uni, MITSU-BISHI) are prepared with approximately 3 mm of lead exposed.

Test panels are prepared with the test coatings. Starting with the softest pencil, the pencil point is moved forward on the coating surface at an angle of 45. The mark is examined with a magnifier or microscope to see if the lead has cut into the film. The procedure is followed with pencils of increasing hardness until the first pencil that cuts into the film is identified. The hardness rating of the previous pencil is the rated hardness of the film.

Corrosion Resistance Test

The corrosion resistance test is a qualitative test that provides a comparison of the durability with respect to corrosion of a multi-layer non-stick coating on the cooking surface of a frying pan. The coated frying pan is pre-cut to the substrate (cast aluminum) and then filled with a 10% salt water solution. The salt water solution in the frying pan is boiled for 8 hours and then kept at room temperature for 16 hours. This 24 hour period is 1 test cycle. Further test cycles are repeated until the coating suffers from visible defects (blistering or corrosion through the coating).

EXAMPLES

Base Coat Ingredients

Polymer Binder

The soluble polymer binder PAI is Torlon® AI-10 poly (amide-imide) (Amoco Chemicals Corp.), a solid resin (which can be reverted to polyamic salt) containing 6-8% of residual NMP and having a number average molecular weight of approximately 12,000.

Insoluble polymer binder particles are polyphenylene sulfide (PQ-208) having an average particle size of 10 micrometers and available from Dainippon Ink and Chemicals, Inc. (Tokyo, Japan).

Inorganic Filler Particles

The inorganic filler particles comprise titanium dioxide and silicon carbide.

Filler particles are titanium dioxide R-900 having an average particle size, $d_{50}$, of 0.15 micrometers and a particle size, $d_{100}$, of 0.30 micrometers and available from DuPont Taiwan. Particle size as determined on a Heloe & Rodos Laser diffraction KA/LA analyzer available from SYMPATEC GmbH Germany.

Large ceramic particles, Silicon carbide, supplied by Elektroschmelzwerk Kempten GmbH (ESK), Munich Germany:

P 600=25.8±1 micrometers average particle size

P 400=35.0±1.5 micrometers average particle size

P 320=46.2±1.5 micrometers average particle size

The average particle size is measured by sedimentation using FEPA-Standard-43-GB 1984R 1993 resp. ISO 6344 according to information provided by the supplier.

TABLE 1

Base Coat (Pre-primer Layer)

| Ingredients | Weight (%) | % Solids of Total Solids (%) |
|---|---|---|
| N-Methyl pyrolidone | 3.2 | |
| Furfuryl alcohol | 3.3 | |
| Surfactant | 1.1 | |
| Distilled Water | 62.4 | |
| Polyamide imide | 5.3 | 17.7 |
| Polyphenylene Sulfide | 7.4 | 24.7 |
| $TiO_2$ | 11.0 | 36.6 |
| Silicon Carbide, P 320 | 6.0 | 20.0 |
| Carbon Black | 0.3 | 1.0 |
| Total | 100.0 | 100.0 |

TABLE 2

Base Coat for Comparative A

| Ingredients | Weight (%) | % Solids of Total Solids (%) |
|---|---|---|
| N-Methyl pyrolidone | 3.2 | |
| Furfuryl alcohol | 3.5 | |
| Amine | 2.2 | |
| Surfactant | 1.0 | |
| Distilled Water | 62.8 | |
| Polyamide imide | 5.4 | 19.8 |
| Polyphenylene Sulfide | 2.7 | 9.9 |
| $TiO_2$ | 18.8 | 68.9 |
| Carbon Black | 0.4 | 1.5 |
| Total | 100.0 | 100.0 |

Primer, Intermediate Layer, Top Coat Ingredients

Fluoropolymer

PTFE dispersion: DuPont TFE fluoropolymer resin dispersion grade 30, available from the DuPont Company, Wilmington, Del.

FEP dispersion: TFE/HFP fluoropolymer resin dispersion with a solids content of from 54.5-56.5 wt % and a particle size of from 150-210 nanometers, the resin having an HFP content of from 9.3-12.4 wt % and a melt flow rate of 11.8-21.3 measured at 372° C. by the method of ASTM D-1238 modified as described in U.S. Pat. No. 4,380,618.

PFA dispersion: DuPont PFA fluoropolymer resin dispersion grade 335, available from the DuPont Company, Wilmington, Del.

Inorganic Filler Particles

Aluminum oxide (small particles) are Ceralox HPA0.5 supplied by Condea Vista Co. average particle size 0.35-0.50 micrometers.

Silicon carbide (as above).

The primer, intermediate layer and top coat are held constant for the samples, and can be any non-stick coatings compositions, such as follows:

TABLE 3

| Primer Composition | |
|---|---|
| Ingredients | Weight Percent |
| PAI-1 | 4.28 |
| Water | 59.35 |
| Furfuryl Alcohol | 3.30 |
| Diethylethanolamine | 0.60 |
| Triethylamine | 1.21 |
| Triethanolamine | 0.20 |
| N-Methylpyrrolidone | 2.81 |
| Furfuryl Alcohol | 1.49 |
| Surfynol 440 surfactant | 0.22 |
| SiC P400 | 3.30 |
| SiC P600 | 3.30 |
| SiC P320 | 1.66 |
| PTFE (solids in aqueous dispersion) | 3.86 |
| Alkylphenylethoxy surfactant | 1.59 |
| FEP (solids in aqueous dispersion) | 2.65 |
| Ludox AM polysilicate | 0.87 |
| Ultramarine blue pigment | 1.63 |
| Carbon black pigment | 0.28 |
| Alumina 0.35-0.50 micrometers | 7.40 |
| Total | 100 |

% solids = 30.4

TABLE 4

| Intermediate layer | |
|---|---|
| Ingredients | Weight Percent |
| PTFE (solids in aqueous dispersion) | 33.80 |
| Nonylphenolpolyethoxy nonionic surfactant | 3.38 |
| Water | 34.82 |
| PFA (solids in aqueous dispersion) | 6.10 |
| Octylphenolpolyethoxy nonionic surfactant | 2.03 |
| Mica Iriodin 153 from MERCK | 1.00 |
| Ultramarine blue pigment | 0.52 |
| Alumina 0.35-0.50 micrometers | 2.39 |
| Triethanolamine | 5.87 |
| Cerium octoate | 0.57 |
| Oleic acid | 1.21 |
| Butylcarbitol | 1.52 |
| Solvesso 100 hydrocarbon | 1.90 |
| Acrylic resin | 4.89 |
| Total | 100 |

TABLE 5

| Top coat | |
|---|---|
| Ingredients | Weight Percent |
| PTFE (solids in aqueous dispersion) | 40.05 |
| Nonylphenolpolyethoxy nonionic surfactant | 4.00 |
| Water | 35.56 |
| PFA (solids in aqueous dispersion) | 2.11 |
| Octylphenolpolyethoxy nonionic surfactant | 1.36 |
| Mica Iriodin 153 from MERCK | 0.43 |
| Cerium octoate | 0.59 |
| Oleic acid | 1.23 |
| Butylcarbitol | 1.55 |
| Triethanolamine | 5.96 |
| Solvesso 100 hydrocarbon | 1.94 |
| Acrylic resin | 5.22 |
| Total | 100 |

Example 1

Abrasion Resistance and Hardness

A base coat of PAI, PPS, silicon carbide, and $TiO_2$ as described in Table 1 is applied by spraying pans and panels of Aluminum AL1050 that have been washed to remove grease and then grit blasted. The weight ratio of inorganic filler particles to polymer binder in the pre-primer layer is approximately 1.4. The dried coating thickness (DFT) of the applied base coat is approximately 15 microns as measured with a film thickness instrument, e.g., Isoscope, based on the eddy-current principle (ASTM B244). This base coat is permitted to dry by forced air drying at 150° C. for 20 minutes. A conventional non-stick coating is applied (similar to the coating described in EP 1 016 466 B1) as follows. A primer coating containing heat resistant polymer binder, fillers and pigments is sprayed over the base coat. The composition for the primer is listed in Table 2. The intermediate layer is then sprayed over the dried primer. The top coat is applied wet on wet to the intermediate layer. The compositions of the intermediate layer and the top coat are listed in Tables 3 and 4 respectively. The coated substrate is baked at 427° C. for 3-5 minutes. The dried coating thicknesses (DFT) for primer/intermediate layer/top coat are determined from eddy current analysis to be 13 micrometers/14 micrometers/6 micrometers (+/−1 micrometer).

The panels were subjected to abrasion resistance and hardness testing as described above under Test Methods (results in Table 6).

1A: Effect of Silicon Carbide

In Table 6, below, the multi-layer coatings for the Comparative and Inventive samples are identical except for the pre-primer base coat layer, for which the Inventive sample uses the composition shown in Table 1 (with silicon carbide in the pre-primer base coat layer), and the Comparative (Comparative A) uses the composition shown in Table 2 (with no silicon carbide in the pre-primer base coat layer).

TABLE 6

| Abrasion Resistance and Hardness for Multi-Layer Coatings | | |
|---|---|---|
| | Comparative A | Inventive |
| Abrasion resistance (cycles) | 10,000 | 100,000 |
| Pencil hardness (room temp) | 2H | 4H |
| Pencil hardness (at 200° C.) | B | 4H |

The multi-layer non-stick coating of the invention (with silicon carbide in the pre-primer base coat layer) shows much better abrasion resistance and hardness than the Comparative multi-layer non-stick coating (with no silicon carbide in the pre-primer base coat layer). Both coatings showed good adhesion to the substrate.

Comparative B in Table 7, below, uses the same formulation for the pre-primer base coat layer shown in Table 1 (for the Inventive composition) except that all of the silicon carbide is a small particle size (same weight of silicon carbide). Other than the pre-primer base coat layer, the coating layers are identical to the inventive multi-layer coating. Scanning electron microscopy was used to confirm that the large particle size silicon carbide particles (46 micrometer particle size) in the inventive pre-primer base coat layer extended at least into the next layer of the multi-layer coating, whereas the small particle size silicon carbide (5 micrometer particle size)

used in Comparative B did not extend into the next layer. Abrasion resistance was evaluated using the Thrust Washer Abrasion Test (ASTM procedure D3702-94), Table 7.

TABLE 7

Abrasion Resistance (Weight Loss) for Multi-Layer Coatings

| | Commercial Ctg | Comparative B | Inventive |
|---|---|---|---|
| Abrasion resistance (weight loss) | 4.1 mg | 3.7 mg | 0.1 mg |

The abrasion resistance of the Inventive multi-layer coating (with large particle size silicon carbide particles in the pre-primer base coat layer extending at least into the next layer of the multi-layer coating) was far superior to that of the Comparative multi-layer coating (which in turn was comparable to a current premium commercial multi-layer product).

1B: Effect of Fluoropolymer

Comparative C in Table 8, below, uses the same formulation for the pre-primer base coat layer shown in Table 1 (for the Inventive composition) except that the Comparative sample base coat comprises 10% by weight of a fluoropolymer component (10% by weight of fluoropolymer solids added as a percentage of the total weight of solids of the base coat composition), whereas the inventive base coat has no fluoropolymer component. Other than the pre-primer base coat layer, the coating layers are identical to the inventive multi-layer coating. Conventional multi-layer non-stick coatings include fluoropolymer in the base coat layer (which is normally the primer). The hardness of the coatings was assessed using the pencil hardness test described above, where the test is performed on the surface of the uppermost layer of the multi-layer coatings. The effect of having no fluoropolymer in the base coat layer is shown in Table 8, below.

TABLE 8

Hardness for Multi-Layer Coatings

| | Comparative C | Inventive |
|---|---|---|
| Pencil hardness (room temp) | 2H-3H | 4H |
| Pencil hardness (at 200° C.) | B | 4H |

The pencil hardness of the Inventive multi-layer coating (with no fluoropolymer in the base coat layer) is improved compared to that of the Comparative multi-layer coating (which latter reflects the conventional use of a fluoropolymer in the base coat layer).

Example 2

Corrosion Resistance

2A: Effect of Titanium Dioxide

The effect of titanium dioxide in the base coat layer was determined in an analogous manner to the studies described above. Only the base coat layer was varied while all samples had the same primer layer, intermediate layer and topcoat layer, applied at the same thickness for each sample. For each sample the base coat layer uses the composition of Table 1, varying only the relative amounts of the titanium dioxide and silicon carbide. There are 3 inorganic fillers in the base coat layer (Table 1): titanium dioxide, silicon carbide and carbon black; the level of carbon black is held constant at 1.7 weight % of the total weight of inorganic fillers. The titanium dioxide and silicon carbide were varied to give levels of titanium dioxide of 0%, 40%, 55%, 60% and 98.3%, expressed as a weight % of titanium dioxide as a percentage of the total weight of inorganic fillers. For compositions requiring additional silicon carbide, the addition used the same large particle size silicon carbide (Silicon Carbide, P 320), except for the 0% $TiO_2$ sample where the addition used small particle size silicon carbide (5 micrometers).

The panels were subjected to corrosion testing as described above under Test Methods (results in Table 9).

TABLE 9

Corrosion Resistance for Multi-Layer Coatings

| Titanium Dioxide Level[1] | Number of Cycles: Defect Free | Number of Cycles: Blisters Observed After |
|---|---|---|
| 0% | 1 Cycle | 2 Cycles |
| 39.9% | 3 Cycles | 4 Cycles |
| 54.9% | 7 Cycles | 8 Cycles |
| 60.1% | 10 Cycles | No Blisters Observed |
| 98.3% | 10 Cycles | No Blisters Observed |

[1]Quantities (grams in 100 grams of base coat formulation) of Titanium Dioxide ($TiO_2$) and Silicon Carbide (SiC) added in the composition of Table 1 are: 11.0 g $TiO_2$, 6.0 g SiC.
For 0% $TiO_2$: 0 g $Ti0_2$, 17.0 g SiC (6.0 g Silicon Carbide, P 320, and 11.0 g small particle size SiC, 5 micrometers particle size).
For 39.9% $TiO_2$: 6.9 g $Ti0_2$, 10.1 g SiC (Silicon Carbide, P 320).
For 54.9% $TiO_2$: 9.5 g $Ti0_2$, 7.5 g SiC (Silicon Carbide, P 320).
For 60.1% $TiO_2$: 10.4 g $Ti0_2$, 6.6 g SiC (Silicon Carbide, P 320).
For 98.3% $TiO_2$: 17 g $Ti0_2$, 0 g SiC (Silicon Carbide, P 320).

Significant improvement in the corrosion resistance of the multi-layer coatings was observed when the base coat layer is a highly filled layer (the weight ratio of inorganic filler particles to polymer binder solids is greater than 1.0) and greater than 50% of the inorganic filler particles are titanium dioxide. Exemplary corrosion resistance was observed for samples where greater than 60% of the inorganic filler particles are titanium dioxide (no failures or defects were observed over 10 test cycles).

What is claimed is:

1. A substrate coated with a multi-layer non-stick coating which resists abrasion force, said coating comprising:

(a) a pre-primer base coat layer, substantially free of fluoropolymer, having a dry film thickness of at least 10 micrometers comprising a heat resistant non-fluoropolymer polymer binder composition and inorganic filler particles, wherein the weight ratio of inorganic filler particles to polymer binder solids is greater than 1.0, and wherein at least 10 weight % of said inorganic filler particles are large ceramic particles having an average particle size of at least 14 micrometers, and greater than 50% of the inorganic filler particles are titanium dioxide having an average particle size of from 0.1 to 2.0 micrometers;

(b) at least two further coating layers, wherein the further coating layers are free of inorganic filler particles having an aspect ratio of greater than 3.0, and wherein at least two of said further coating layers comprise one or more fluoropolymer; and wherein a portion of the large ceramic particles extend from the pre-primer base coat layer at least into the next adjacent layer and further wherein substantially free of fluoropolymer means that the composition employed forms a dry base coat that contains less than 5 weight % of total solids of fluoropolymer.

2. The coated substrate of claim 1 wherein at least 60% of the inorganic filler particles in the base coat are titanium dioxide.

3. The coated substrate of claim 1 wherein said base coat has a dry film thickness in the range of about 10 to about 40 micrometers.

4. The coated substrate of claim 1 wherein said heat resistant non-fluoropolymer binder comprises one or more polymer selected from the group consisting of polyimide (PI), polyamideimide (PAI), polyether sulfone (PES), polyphenylene sulfide (PPS) and combinations thereof.

5. The coated substrate of claim 1 wherein said non-fluoropolymer binder comprises a combination of polyamideimide (PAI) and polyphenylene sulfide (PPS).

6. The coated substrate of claim 1 wherein said substrate is a metal substrate selected from the group consisting of aluminum, stainless steel, and carbon steel.

7. The coated substrate of claim 1 wherein said substrate is stainless steel.

8. The coated substrate of claim 1 wherein said inorganic filler comprises one or more of the inorganic oxides of titanium, aluminum, zinc, tin and mixtures thereof.

9. The coated substrate of claim 1 wherein said ceramic particles have an average particle size greater than 20 micrometers.

10. The coated substrate of claim 1 wherein said ceramic particles have an average particle size in the range of 14 to 60 micrometers.

11. The coated substrate of claim 1 wherein said ceramic particles have a Knoop hardness of at least 1200.

12. The coated substrate of claim 11 wherein said ceramic particles have an aspect ratio of not greater than 2.5.

13. The coated substrate of claim 11 wherein said ceramic particles are selected from a group consisting of inorganic nitrides, carbides, borides and oxides.

14. The coated substrate of claim 11 wherein said ceramic particles are silicon carbide.

15. The coated substrate of claim 14 wherein said silicon carbide particles have an aspect ratio of not greater than 2.5 and an average particle size greater than 20 micrometers.

16. The coated substrate of claim 1 wherein at least 90% by weight of the total weight of inorganic filler particles consists only of silicon carbide and titanium dioxide.

* * * * *